(12) United States Patent
Yin et al.

(10) Patent No.: US 11,663,260 B2
(45) Date of Patent: May 30, 2023

(54) METHOD AND APPARATUS FOR SEARCHING MULTIMEDIA CONTENT DEVICE, AND STORAGE MEDIUM

(71) Applicant: Baidu Online Network Technology (Beijing) Co., Ltd., Beijing (CN)

(72) Inventors: Liang Yin, Beijing (CN); Qiankun Lu, Beijing (CN); Lian Zhao, Beijing (CN); Lin Liu, Beijing (CN); Qing Xu, Beijing (CN); Xiang He, Beijing (CN); Yabo Fan, Beijing (CN); Yulei Qian, Beijing (CN); Feng Ren, Beijing (CN); Zhipeng Jin, Beijing (CN); Qiaohua Wang, Beijing (CN); Lei Shen, Beijing (CN); Yunzheng Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 223 days.

(21) Appl. No.: 17/205,459

(22) Filed: Mar. 18, 2021

(65) Prior Publication Data
US 2021/0209146 A1    Jul. 8, 2021

(30) Foreign Application Priority Data
Apr. 8, 2020    (CN) .......................... 202010271903.9

(51) Int. Cl.
*G06F 16/00* (2019.01)
*G06F 16/432* (2019.01)
*G06F 16/45* (2019.01)
*G06F 17/16* (2006.01)
*G06Q 30/0251* (2023.01)

(52) U.S. Cl.
CPC ............ *G06F 16/432* (2019.01); *G06F 16/45* (2019.01); *G06F 17/16* (2013.01); *G06Q 30/0271* (2013.01)

(58) Field of Classification Search
CPC ........ G06F 16/432; G06F 16/45; G06F 17/16; G06F 16/3347; G06F 16/901;
(Continued)

(56) References Cited

U.S. PATENT DOCUMENTS 6,134,541 A  * 10/2000 Castelli ............... G06F 16/2264
6,675,174 B1 *  1/2004 Bolle ..................... G06V 20/40
                                                 707/999.102
(Continued)

FOREIGN PATENT DOCUMENTS

CN    104199842 A    12/2014
CN    106844715 A     6/2017
(Continued)

OTHER PUBLICATIONS

Japanese Office Action corresponding to Japanese Patent Application No. 2021-048959, dated Aug. 26, 2022 (7 pages).
(Continued)

*Primary Examiner* — Jared M Bibbee
(74) *Attorney, Agent, or Firm* — Maginot, Moore & Beck LLP

(57) ABSTRACT

The present application relates to a field of smart searching technology, and provides a method and an apparatus for searching a multimedia content, a device, and a storage medium. The method includes: acquiring a query vector of query information; determining, from a search library, a first category matching the query vector, wherein the search library comprises a plurality of categories, each of the categories comprises a plurality of vectors, and each of the vectors is associated with a corresponding multimedia content; and inquiring, in the first category, a target vector matching the query vector, and acquiring the multimedia content corresponding to the target vector.

12 Claims, 2 Drawing Sheets

(58) Field of Classification Search
CPC ...... G06F 16/906; G06F 16/535; G06F 16/41; G06F 16/435; G06F 16/438; G06F 16/48; G06Q 30/0271
See application file for complete search history.

(56) References Cited

U.S. PATENT DOCUMENTS

| | | | |
|---|---|---|---|
| 2015/0052139 A1* | 2/2015 | Cevahir | G06K 9/6271 707/737 |
| 2018/0101570 A1* | 4/2018 | Kumar | G06F 16/24537 |

FOREIGN PATENT DOCUMENTS

| | | |
|---|---|---|
| CN | 110175249 A | 8/2019 |
| JP | 2013012076 A | 1/2013 |
| JP | 2013065146 A | 4/2013 |
| JP | 2015228083 A | 12/2015 |

OTHER PUBLICATIONS

English Translation of Japanese Office Action corresponding to Japanese Patent Application No. 2021-048959, dated Aug. 26, 2022 (6 pages).
Machine Translation of JP2015228083A. (25 Pages).
Extended European Search Report corresponding to European Patent Application No. 21163712.9, dated Apr. 16, 2021 (9 pages).
Salton Gerard et al: "The SMART and SIRE Experimental Retrieval Systems" In: "Introduction to Modern Information Retrieval". Dec. 31, 1983 (Dec. 31, 1983). McGraw-Hill Book Company. XP055792274. (42 Pages).
Griffiths A et al: "Hierarchic Agglomerative Clustering Methods for Automatic Document Classification". Journal of Documentation. ASLIB. London. GB. vol. 40. No. 3. Sep. 1, 1984 (Sep. 1, 1984). pp. 175-205, XP009128011. (32 Pages).
Voorhees Ellen M: "The Effectiveness and Efficiency of Agglomerative Hierarchic Clustering in Document Retrieval". Oct. 31, 1985 (Oct. 31, 1985). pp. 1-192. XP055792218. Retrieved from the Internet: URL:https://ecommons.cornell.edu/handle/1813/6545> (192 Pages).
Japanese Office Action corresponding to Japanese Patent Application No. 2021-048959, dated Feb. 1, 2022 (7 pages).
English Translation of Japanese Office Action corresponding to Japanese Patent Application No. 2021-048959, dated Feb. 1, 2022 (7 pages).
Machine Translation of JP2013012076. (21 Pages).
Gong, Yunchao, et al. "Iterative quantization: A procrustean approach to learning binary codes for large-scale image retrieval." IEEE transactions on pattern analysis and machine intelligence 35.12 (2012): 2916-2929. (15 Pages).

* cited by examiner

METHOD AND APPARATUS FOR SEARCHING MULTIMEDIA CONTENT DEVICE, AND STORAGE MEDIUM

CROSS-REFERENCE TO RELATED APPLICATION

The present application claims priority of the Chinese patent application No. 202010271903.9 filed in China on Apr. 8, 2020, which is incorporated herein by reference in its entirety.

TECHNICAL FIELD

The present application relates to intelligent searching in the field of computer technology, in particular to a method and an apparatus for searching a multimedia content, a device, and a storage medium.

BACKGROUND

In some scenarios, usually it is necessary to acquire related multimedia contents through searching, e.g., to provide an advertisement picture through searching pictures. However, currently, during the searching, word segmentation is performed on query information (e.g., description text of an advertisement and a picture), and results are screened preliminarily, and then features of the multimedia contents are extracted from the screened results to create a feature database of the multimedia contents. Next, similarity calculation is performed in accordance with features of the query information and the features of the multimedia contents, i.e., brute force search is performed within a global space. In this regard, a long search time is consumed, leading to low search efficiency.

SUMMARY

The present application provides a method and an apparatus for searching a multimedia content, a device, and a storage medium, so as to increase the searching efficiency.

In a first aspect, the present application provides a method for searching a multimedia content, including: acquiring a query vector of query information; determining, from a search library, a first category matching the query vector, wherein the search library comprises a plurality of categories, each of the categories comprises a plurality of vectors, and each of the vectors is associated with a corresponding multimedia content; and inquiring, in the first category, a target vector matching the query vector, and acquiring the multimedia content corresponding to the target vector.

In a second aspect, the present application provides an apparatus for searching a multimedia content, including: a first acquisition module configured to acquire a query vector of query information; a determination module configured to determine, from a search library, a first category matching the query vector, wherein the search library comprises a plurality of categories, each of the categories comprises a plurality of vectors, and each of the vectors is associated with a corresponding multimedia content; and a second acquisition module configured to inquire, in the first category, a target vector matching the query vector, and acquire the multimedia content corresponding to the target vector.

In a third aspect, the present application provides an electronic device, including at least one processor, and a memory configured to be in communication connection with the at least one processor, the memory is further configured to store therein an instruction capable of being executed by the at least one processor, wherein the processor is configured to execute the instruction, to implement the above-mentioned method for searching the multimedia content.

In a fourth aspect, the present application provides in some embodiments a non-transitory computer-readable storage medium storing therein a computer instruction, the computer instruction is configured to be executed by a computer to implement the above-mentioned method for searching the multimedia content.

According to the scheme in the embodiments of the present application, it is able to improve the searching efficiency.

It is understood that, this summary is not intended to identify key features or essential features of the embodiments of the present application, nor is it intended to be used to limit the scope of the present application. Other features of the present disclosure will become more comprehensible with reference to the following description.

BRIEF DESCRIPTION OF THE DRAWINGS

The following drawings are provided to facilitate the understanding of the present application, but shall not be construed as limiting the present application. In these drawings.

DETAILED DESCRIPTION

In the following description, numerous details of the embodiments of the present application, which should be deemed merely as exemplary, are set forth with reference to accompanying drawings to provide a thorough understanding of the embodiments of the present application. Therefore, those skilled in the art will appreciate that modifications or replacements may be made in the described embodiments without departing from the scope and spirit of the present application. Further, for clarity and conciseness, descriptions of known functions and structures are omitted.

Figure 1:
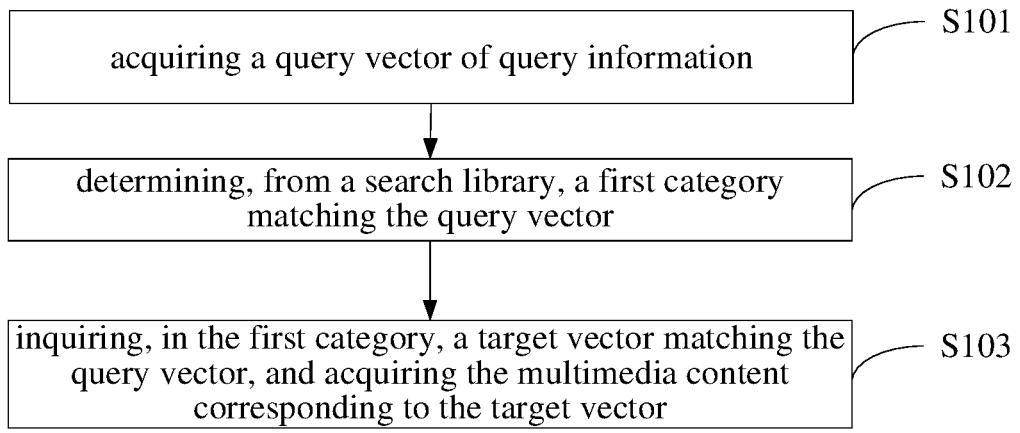
FIG. 1 is a flow chart of a method for searching a multimedia content according to an embodiment of the present application.

The present application provides in some embodiments a method for searching a multimedia content which, as shown in the flow chart of FIG. 1, includes the following steps.

Step S101: acquiring a query vector of query information.

The query information may be inputted by a user, or automatically generated by an electronic device. In addition, the query information may be information such as picture, word or voice.

The query vector may be a vector acquired through quantizing the query information, or a feature vector of the query information.

Step S102: determining, from a search library, a first category matching the query vector, wherein the search library comprises a plurality of categories, each of the categories comprises a plurality of vectors, and each of the vectors is associated with a corresponding multimedia content.

The search library may be a local or remote search library, and the search library may be a distributed or non-distributed search library.

The search library may include a plurality of categories, and each category includes a plurality of vectors. Further, the plurality of categories may be acquired through clustering the plurality of vectors using a clustering algorithm, e.g., using a distributed k-means clustering algorithm.

It should be appreciated that, in the embodiments of the present application, the category may also be called as a rough classifier or a cluster.

The first category matching the query vector may be one or more categories where a vector in the one or more categories matches the query vector. Here, the word "match" refers to that the vectors are similar or there is a relatively small vector residual error.

In the present application, when a vector is associated with a corresponding multimedia content, each multimedia content may be associated with one or more vectors. The vector associated with the multimedia content may be a vector acquired through quantizing relevant information about the multimedia content, e.g., through quantizing information such as keyword, description information, tag, picture content or name, or may be a feature vector of the multimedia content.

In the embodiments of the present application, the multimedia content may be picture, video or text, or a combination thereof.

Step S103: inquiring, in the first category, a target vector matching the query vector, and acquiring the multimedia content corresponding to the target vector.

The inquiring in the first category the target vector matching the query vector may include inquiring one or more vectors matching the query vector in the first category. Here, the word "matching" may refer to similarity matching or residual error matching.

Optionally, the target vector may be determined from the first category using an Approximate Nearest Neighbor (ANN) method.

After determining the target vector, the multimedia content associated therewith may be determined.

In the embodiments of the present application, the vector associated with the multimedia content may be taken as an index in the search library, and the search may be performed on the category after the category has been determined, so as to improve the searching efficiency.

In addition, the vector used in the embodiments of the present application may be a vector acquired through a model such as a w2v model, a bert model or an ernie model. Because the detection is performed in accordance with the vector, it is able to perform the similarity calculation in a more accurate manner, thereby to improve the recall accuracy. Further, the multimedia content is retrieved in accordance with the vector, so it is able to perform the search in an inverted-index manner without any brute force calculation, thereby to recall the final multimedia content.

It should be appreciated that, the method in the embodiments of the present application may be applied to an advertisement configuration scenario. It is noted that, the method in the embodiments of the present application may also be applied to any other scenario where the multimedia content is to be searched.

Further, the method may be applied to an electronic device, e.g., a server, a computer or a mobile phone.

In a possible embodiment of the present application, the determining from the search library the first category matching the query vector may include: calculating a residual error between a central point vector of each category in the search library and the query vector, and determining the first category in accordance with the residual error, wherein each category in the search library comprises the central point vector.

The first category may include one or more categories with a smallest residual error in the plurality of categories, or top N categories in the plurality of categories ranked in accordance with the residual errors. Further, the residual error may also be understood as a distance between each central point vector and the query vector, e.g., a Symmetric Distance Computation (SDC) or an Asymmetric Distance Computation (ADC). Furthermore, the first category may include top N categories acquired after performing local rotation on the residual errors. A modulus of a rotation vector for the local rotation may be 1. In this regard, when the categories are ranked in accordance with the ADC, the residual errors may be rotated, and then the top N categories may be ranked in accordance with the ADC to acquire a sequence, which is equivalent to an original sequence.

It is a smallest one category or plurality of categories, or the top N-ranked categories acquired through ranking the categories according to the residual error.

During the implementation, the first category may be determined merely through calculating the residual error between the query vector and the central point vector, so it is able to reduce the calculation burden, thereby to further improve the searching efficiency.

In a possible embodiment of the present application, a central point vector of a target category of the search library may be determined in accordance with a sum of all vectors in the target category and/or the quantity of the vectors in the target category, and the target category may be any category in the search library.

Determining the central point vector in accordance with the sum of all vectors in the target category and/or the quantity of the vectors in the target category may include determining a change in the central point vector in accordance with the sum of all vectors in the target category and/or the quantity of the vectors in the target category in an iteration process of the categories, e.g., a residual error of distance. For example, a central point vector may be selected in advance for each category, and then a change in the central point vector may be calculated in accordance with the sum of all vectors in the category and the quantity of the vectors in the category in the iteration process of the categories, so as to determine a new central point vector. In addition, each vector may be divided into several segments (a same operation may also be performed on the central point vector), and a distance between the vector and the central point vector may be a sum of distances between the segments of the vector and corresponding segments of the central point vector. In this regard, it is able to encode each vector with different segments independently, so as to improve the searching efficiency.

Figure 2:
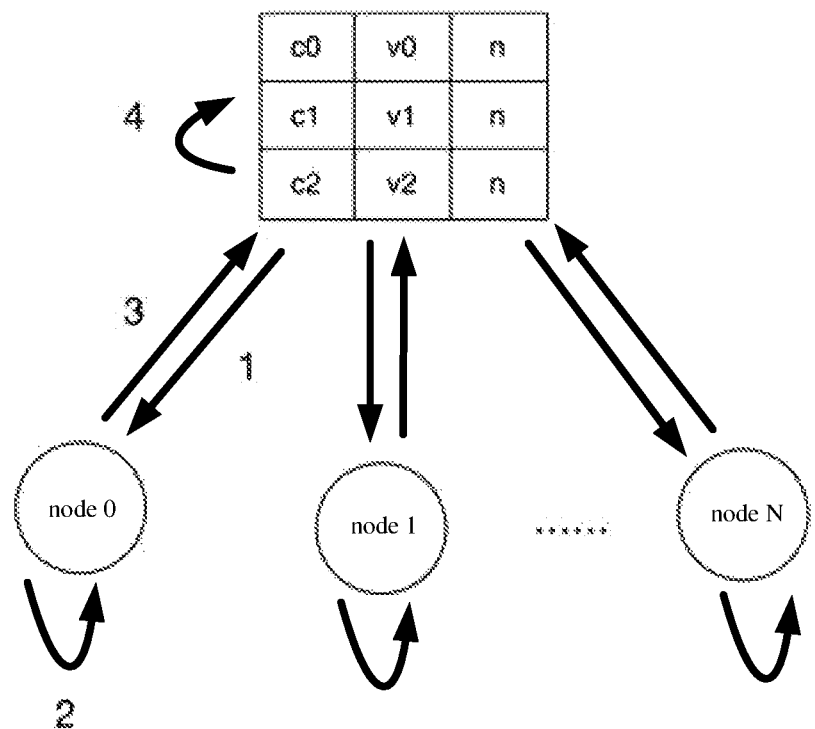
FIG. 2 is a schematic view showing the determination of central point vectors according to an embodiment of the present application.

As shown in FIG. 2, description information about central points of the categories may be stored in a table (e.g., elf_table), including an identity (ID) of a central point in the category, a sum of all vectors in the category, and the quantity of vectors in the category. In a distributed system, each node may independently acquire central points of all categories stored in the table, and calculate each central point (also called as cluster center point) in accordance with the sum of all vectors in the category and/or the quantity of the vectors in the category. During the calculation of a new central point, a change in the central point in each vector may be sequentially calculated for a current node. Here, merely the change in the central point is calculated, rather than that the central point is calculated again. In this regard, it is able to reduce a time overhead caused due to the serialization, deserialization and combination of the vectors each time when the central point is calculated again, facilitate the recording of the quantity of the vectors whose central points have changed in each iteration, and determine whether an algorithm converges based thereon.

In addition, with respect to a central point vector of the target category in the search library, a vector in the center of the category may be further determined in accordance with the sum of all vectors in the target category and/or the quantity of the vectors in the target category.

During the implementation, the central point vector may be determined in accordance with the sum of all vectors in the target category and the quantity of the vectors in the target category, so as to update the central point vector in time during the iteration.

It should be appreciated that, in the embodiments of the present disclosure, the first category may be determined in accordance with other content in each category, e.g., feature information about each category, but not limited to the central point vector of each category.

In a possible embodiment of the present application, the inquiring the target vector matching the query vector in the first category and acquiring the multimedia content corresponding to the target vector may include calculating a residual error between the query vector and each of a plurality of central sub-vectors (also called as secondary central point vectors) in the first category, taking N central sub-vectors in the plurality of central sub-vectors as a target vector matching the query vector in accordance with the residual error, and acquiring the multimedia content corresponding to the target vector, N being an integer greater than or equal to 1.

During the implementation, each category may include one central point vector, and the plurality of central point sub-vectors, i.e., each category may include the central point vectors at two levels. In addition, each central point vector may correspond to one or more vectors.

Identically, the residual error may be also understood as a distance between each secondary central point vector and the query vector, e.g., SDC or ADC.

The taking the N central sub-vectors in the plurality of central sub-vectors as the target vectors matching the query vector in accordance with the residual error may include ranking the plurality of central sub-vectors in accordance with the residual errors, and selecting top N central sub-vectors.

During the implementation, the target vector may be determined in accordance with the residual error. In this regard, it is able to accurately determine the target vector and reduce the calculation burden.

Further, when calculating the distance between the query vector and each central sub-vector (also called as to-be-searched vector), the ADC may be used preferentially for measurement. For example, for a query vector x and a central sub-vector y, x and an expression q(y) acquired through quantizing y may be used to replace a distance between x and y. The quantity of q(y) is merely associated with the quantity of secondary quantizers, so it is able to increase a query speed through a lookup table consisting of x and q(y).

It should be appreciated that, in the embodiments of the present application, the target vector may not be limited to be determined in accordance with the central point sub-vectors in the category. For example, the central sub-vector may not be calculated, and instead, the residual error between each vector in the category and the query vector may be directly calculated so as to determine the final target vector.

In a possible embodiment of the present application, the query vector may be a vector acquired through rotating and quantizing a vector of the query information. Each vector in the search library may be a vector which is rotated and quantized and which is subjected to vector centralization in accordance with a central point vector in each category before the rotation.

When the query vector is a vector acquired through rotating and quantizing the vector of the query information, the vector of the query information may be rotated in accordance with a rotation vector, and then Product Quantization (PQ) may be performed, so as to acquire the query vector. The rotation vector may be a vector having a modulus of 1.

Each vector in the search library may be acquired as follows.

Vector centralization may be performed. To be specific, all vectors may be traversed using a central vector in the category, so as to perform the centralization on the vectors.

A covariance matrix may be calculated with respect to each node. For each node, inner products of the vectors in a same category may be accumulated, and added into a new table in the search library, so as to acquire a final covariance estimate at each node. Then, the covariance matrix may be calculated in accordance with the covariance estimates.

The matrix may be subjected to feature value decomposition so as to acquire a feature value and a feature vector, and then a transposed matrix R, i.e., a matrix used for the rotation, may be created.

All vectors in the category may be projected to a new space using the transposed matrix R, i.e., the vector and the transposed matrix may be multiplied.

Then, the PQ may be performed on vectors in the new space, so as to acquire the vectors in the search library.

The covariance matrix may be expressed as $cov=(c+c^T)/((2\times(n-1))^{-v^T v}}$, where cov represents the covariance matrix, c represents a sum of the inner products of all the vectors in the category, n represents the quantity of vectors in the category, and v represents the central point vector in the category.

It should be appreciated that, different covariance matrices may be acquired for different categories, and then the vectors may be rotated in different modes. The projecting all the vectors in the category using the transposed matrix R to the new space may include rotating the vectors in the search library.

The vector centralization, the calculation of the covariance matrix and the projection of the vectors to the new space may be performed in a distributed manner through inter-node concurrency (with concurrent granularity as training data). In this regard, it is able to support the creation of indices of massive data sets through increasing the quantity of calculation nodes, thereby to create an index database and perform search matching within a short time period.

The acquisition of the final covariance estimate and the calculation of the covariance matrix by each node, as well as the creation of the transposed matrix R, may be performed concurrently through merely calculating, by each node, the central point vectors of a part of the categories.

It should be appreciated that, the vectors in the search library may be preconfigured, e.g., determined in a training process.

During the implementation, the query vector may be a vector acquired through rotating and quantizing the vector of the query information, and the vector in the search library may be a vector which has been rotated and quantized and on which the vector centralization has been performed in accordance with the central point vector of the category before the rotation. In this regard, it is able to perform local optimization on the vector, thereby to further reduce the calculation burden and further improve the searching efficiency.

In addition, in the embodiments of the present application, the vector in the search library may also be acquired directly through a Local Optimization Product Quantization (LOPQ) algorithm.

In addition, in the embodiments of the present application, with respect to the multimedia content of the search library, a user ID of the multimedia contents may be extended before determining the category of the search library, so as to acquire the multimedia contents for more users, e.g., advertisement pictures for more users, so as to optimize a scenario of the multimedia content, and improve the extendibility and universality of the search. In other words, before determining the category, one layer may be added, so as to acquire more scenarios of the multimedia contents. Next, the category may be determined in accordance with a constraint condition, and then the separate LOPQ recall may be performed in the category. As a result, it is able to provide a new mode rather than a recall-and-then-screen mode, and increase a recall rate in a scenario with constraint conditions.

In the embodiments of the present application, the vector associated with the multimedia content may be taken as an index of the search library. In addition, the category may be determined and then the multimedia content may be searched in the category. In this regard, it is able to improve the searching efficiency.

Figure 3:
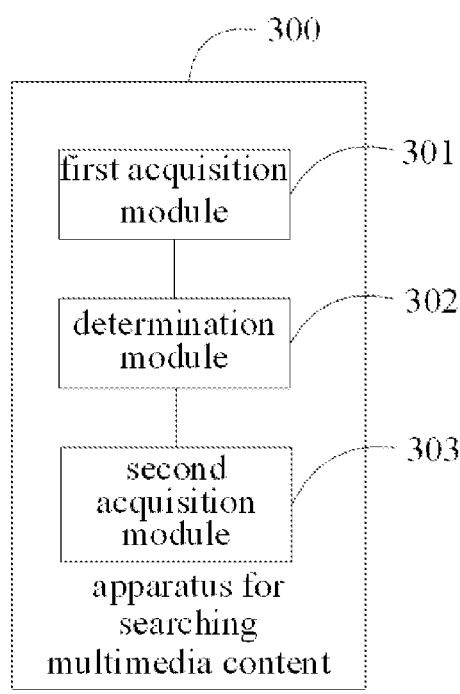
FIG. 3 is a schematic view showing an apparatus for searching a multimedia content according to an embodiment of the present application.

The present application further provides an apparatus 300 for searching a multimedia content which, as shown in FIG. 3, includes: a first acquisition module 301 configured to acquire a query vector of query information; a determination module 302 configured to determine, from a search library, a first category matching the query vector, wherein the search library comprises a plurality of categories, each of the categories comprises a plurality of vectors, and each of the vectors is associated with a corresponding multimedia content; and a second acquisition module 303 configured to inquire, in the first category, a target vector matching the query vector, and acquire the multimedia content corresponding to the target vector.

In a possible embodiment of the present application, the determination module 302 is further configured to calculate a residual error between a central point vector of each category in the search library and the query vector, and determine the first category in accordance with the residual error, wherein each category in the search library comprises the central point vector.

In a possible embodiment of the present application, a central point vector of a target category in the search library is determined in accordance with a sum of all vectors included in the target category and/or the quantity of the vectors included in the target category, and the target category is any category in the search library.

In a possible embodiment of the present application, the second acquisition module 303 is further configured to calculate a residual error between the query vector and each of a plurality of central sub-vectors in the first category, take N central sub-vectors in the plurality of central sub-vectors as the target vector matching the query vector in accordance with the residual errors, and acquire the multimedia content corresponding to the target vector, where N is an integer greater than or equal to 1.

In a possible embodiment of the present application, the query vector is a vector acquired through rotating and quantizing a vector of the query information, and the vector in the search library is a vector which has been rotated and quantized and on which vector centralization has been performed in accordance with the central point vector in the category before the rotation.

The apparatus in the embodiments of the present application is capable of implementing the procedures of the method mentioned hereinabove with a same beneficial effect, which will not be repeated herein.

The present application further provides in some embodiments an electronic device and a computer-readable storage medium.

Figure 4:
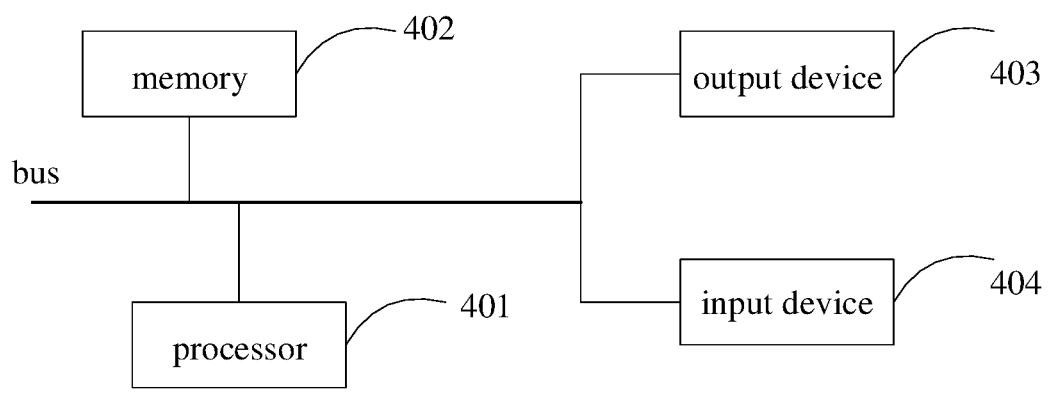
FIG. 4 is a block diagram of an electronic device for implementing the method for searching the multimedia content according to an embodiment of the present application.

FIG. 4 is a block diagram of the electronic device for implementing the above-mentioned method for searching the multimedia content according to the embodiments of the present disclosure. The electronic device is intended to represent a digital computer in various forms, e.g., laptop computer, desktop computer, work station, personal digital assistant, server, blade server, large-scale computer, or another suitable computer. The electronic device may also represent a mobile device in various forms, e.g., personal digital assistant, cellular phone, smart phone, wearable device, or another similar computing device. The components shown herein, their connections and relationships, and their functions, are meant to be exemplary only, and are not meant to limit implementations of the present application described and/or claimed herein.

As shown in FIG. 4, the electronic device includes one or more processors 401, a memory 402, and interfaces for connecting the components, e.g., a high-speed interface and a low-speed interface. The components may be connected to each other via different buses, and installed on a common motherboard or installed in another form according to the practical need. The processor is configured to process instructions to be executed within the electronic device, including an instruction stored in the memory or an instruction stored in the memory for displaying Graphical User Interface (GUI) information on an external input/output device (e.g., a display device coupled to an interface). In some other embodiments of the present application, if necessary, the plurality of processors and/or buses may be used together with a plurality of memories. Identically, a plurality of electronic devices may be provided, and each electronic device may be used to perform a part of necessary operations (e.g., as a server array, a group of blade servers, or a multi-processor system). In FIG. 4, one processor 401 is shown as an example.

The memory 402 may be just the non-transitory computer-readable storage medium in the embodiments of the present application. Instructions capable of being executed by at least one processor may be stored in the memory, so as to enable the at least one processor to implement the method for searching the multimedia content provided by the embodiments of the present disclosure. The non-transitory computer-readable storage medium may store therein a computer program, and the computer instruction is executed by a computer so as to implement the method for searching the multimedia content provided by the embodiments of the present disclosure.

As a non-transitory computer-readable storage medium, the memory 402 may store therein a non-transitory software program, a non-transitory computer-executable program and a module, e.g., program instructions/modules corresponding to the method for searching the multimedia content (e.g., the first acquisition module 301, the determination module 302 and the second acquisition module 303 in FIG. 3) in the embodiments of the present disclosure. The processor 401 is configured to execute the non-transitory software program, instruction and module stored in the memory 402, so as to execute various function applications in the server as well as data processing, i.e., to implement the above-mentioned method for searching the multimedia content.

The memory 402 may include a program storage area and a data storage area. An operating system and an application for at least one function may be stored in the program storage area. Data created in accordance with the operation of the electronic device for implementing the method for searching the multimedia content may be stored in the data storage area. In addition, the memory 402 may include a high-speed random access memory, and a non-transitory memory, e.g., at least one magnetic disk, a flash memory, or another non-transitory solid-state memory. In some embodiments of the present application, the memory 402 may optionally include memories arranged remotely relative to the processor 401, and these remote memories may be connected to the electronic device for implementing the method for searching the multimedia content via a network. Examples of the network may include, but not limited to, Internet, Intranet, local area network or mobile communication network, or a combination thereof.

The electronic device for implementing the method for searching the multimedia content may further include an input device 403 and an output device 404. The processor 401, the memory 402, the input device 403 and the output device 404 may be connected via a bus or the like. In FIG. 4, they are connected via a bus.

The input device 403 may receive digital or character information being inputted, and generate a key signal input related to user settings and function control of the electronic device for implementing the method for searching the multimedia content, e.g., touch panel, keypad, mouse, trackpad, touchpad, indication rod, one or more mouse buttons, track ball, or joystick. The output device 404 may include a display device, an auxiliary lighting device (e.g., Light-Emitting Diode (LED)) or a haptic feedback device (e.g., vibration motor). The display device may include, but not limited to, a Liquid Crystal Display (LCD), an LED display or a plasma display. In some embodiments of the present application, the display device may be a touch panel.

Various implementations of the aforementioned systems and techniques may be implemented in a digital electronic circuit system, an integrated circuit system, an Application-Specific Integrated Circuit (ASIC), computer hardware, firmware, software, or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

These computer programs (also called as programs, software, software application or codes) may include machine instructions for the programmable processor, and they may be implemented using an advanced process and/or an object oriented programming language, and/or an assembly/machine language. The terms "machine-readable medium" and "computer-readable medium" used in the context may refer to any computer program products, apparatus and/or devices (e.g., magnetic disc, optical disc, memory or Programmable Logic Device (PLD)) capable of providing the machine instructions and/or data to the programmable processor, including a machine-readable medium that receives a machine instruction as a machine-readable signal. The term "machine-readable signal" may refer to any signal through which the machine instructions and/or data are provided to the programmable processor.

To facilitate user interaction, the system and technique described herein may be implemented on a computer. The computer is provided with a display device (for example, a Cathode Ray Tube (CRT) or Liquid Crystal Display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or a computing system that includes a middle-ware component (e.g., an application server), or a computing system that includes a front-end component (e.g., a client computer having a graphical user interface or a Web browser through which a user can interact with an implementation of the system and technique described herein), or a computing system that includes any combination of such back-end, middleware, or front-end components. The components of the system can be interconnected by any form or medium of digital data communication (e.g., a communication network). Examples of communication networks include a Local Area Network (LAN), a Wide Area Network (WAN) and the Internet.

The computer system can include a client and a server. The client and server are generally remote from each other and typically interact through a communication network. The relationship of client and server arises by virtue of computer programs running on respective computers and having a client-server relationship to each other.

According to the scheme in the embodiments of the present application, a candidate subject concept may be filtered using a sequence of characteristic or property of a word of the candidate subject concept, so as to reduce the labor cost for mining the subject concept.

It should be appreciated that, various forms of processes shown above may be used, and steps thereof may be reordered, added or deleted. For example, as long as expected results of the technical solutions of the present application can be achieved, steps set forth in the present application may be performed in parallel, performed sequentially, or performed in a different order, and there is no limitation in this regard.

The foregoing specific implementations constitute no limitation on the scope of the present application. It is appreciated by those skilled in the art, various modifications, combinations, sub-combinations and replacements may be made according to design requirements and other factors. Any modifications, equivalent replacements and improvements made without deviating from the spirit and principle of the present application shall be deemed as falling within the scope of the present application.

What is claimed is:

1. A method for searching a multimedia content, performed by a processor in an electronic device, comprising:
acquiring, by the processor, a query vector of query information;
determining, by the processor, from a search library, a first category matching the query vector, wherein the search library comprises a plurality of categories, each of the categories comprises a plurality of vectors, and each of the vectors is associated with corresponding multimedia content; and
inquiring, by the processor, in the first category, a target vector matching the query vector, and acquiring the multimedia content corresponding to the target vector;
wherein the query vector is a vector acquired through rotating and quantizing a vector of the query information, and the vector in the search library is a vector which has been subjected to rotation according to a transposed matrix and quantized and on which vector centralization has been performed in accordance with a central point vector in the category before the rotation;
wherein before the rotation, the method further includes:
acquiring, by the processor, a feature value and a feature vector by performing feature value decomposition on a covariance matrix before the rotation, wherein the covariance matrix is expressed as $cov=(c+c^T)/(2\times(n-1))-v^Tv$, wherein cov represents the covariance matrix, c represents a sum of inner products of all vectors in each category of the search library, n represents a quantity of vectors in each category of the search library, and v represents the central point vector in each category of the search library;
creating, by the processor, the transposed matrix according to the feature value and the feature vector.

2. The method according to claim 1, wherein determining the first category matching the query vector comprises:
calculating a residual error between the central point vector of each category in the search library and the query vector, and determining the first category in accordance with the residual error.

3. The method according to claim 2, wherein a central point vector of a target category in the search library is determined in accordance with a sum of all vectors included in the target category and/or the quantity of the vectors included in the target category, and the target category is any category in the search library.

4. The method according to claim 1, wherein inquiring in the first category the target vector matching the query vector and acquiring the multimedia content corresponding to the target vector comprises:
calculating a residual error between the query vector and each of a plurality of central sub-vectors in the first category, taking N central sub-vectors in the plurality of central sub-vectors as the target vector matching the query vector in accordance with the residual errors, and acquiring the multimedia content corresponding to the target vector, where N is an integer greater than or equal to 1.

5. An electronic device, comprising:
at least one processor; and
a memory configured to be in communication connection with the at least one processor,
wherein the memory is further configured to store therein an instruction capable of being executed by the at least one processor, wherein the processor is configured to execute the instruction to:
acquire a query vector of query information;
determine, from a search library, a first category matching the query vector, wherein the search library comprises a plurality of categories, each of the categories comprises a plurality of vectors, and each of the vectors is associated with a corresponding multimedia content; and
inquire, in the first category, a target vector matching the query vector, and acquire the multimedia content corresponding to the target vector;
wherein the query vector is a vector acquired through rotating and quantizing a vector of the query information, and the vector in the search library is a vector which has been subjected to rotation according to a transposed matrix and quantized and on which vector centralization has been performed in accordance with a central point vector in the category before the rotation;
wherein before the rotation, the processor is configured to execute the instruction to:
acquire a feature value and a feature vector by performing feature value decomposition on a covariance matrix before the rotation, wherein the covariance matrix is expressed as $cov=(c+c^T)/(2\times(n-1))-v^Tv$, wherein cov represents the covariance matrix, c represents a sum of inner products of all vectors in each category of the search library, n represents a quantity of vectors in each category of the search library, and v represents the central point vector in each category of the search library;
create the transposed matrix according to the feature value and the feature vector.

6. The electronic device according to claim 5, wherein the processor is further configured to execute the instruction to:
calculate a residual error between the central point vector of each category in the search library and the query vector, and determine the first category in accordance with the residual error.

7. The electronic device according to claim 6, wherein a central point vector of a target category in the search library is determined in accordance with a sum of all vectors included in the target category and/or the quantity of the vectors included in the target category, and the target category is any category in the search library.

8. The electronic device according to claim 5, wherein the processor is further configured to execute the instruction to:
calculate a residual error between the query vector and each of a plurality of central sub-vectors in the first category, take N central sub-vectors in the plurality of central sub-vectors as the target vector matching the query vector in accordance with the residual errors, and acquire the multimedia content corresponding to the target vector, where N is an integer greater than or equal to 1.

9. A non-transitory computer-readable storage medium storing therein a computer instruction, wherein the computer instruction is configured to be executed by a computer to:
acquire a query vector of query information;
determine, from a search library, a first category matching the query vector, wherein the search library comprises a plurality of categories, each of the categories comprises a plurality of vectors, and each of the vectors is associated with a corresponding multimedia content; and inquire, in the first category, a target vector matching the query vector, and acquire the multimedia content corresponding to the target vector;

wherein the query vector is a vector acquired through rotating and quantizing a vector of the query information, and the vector in the search library is a vector which has been subjected to rotation according to a transposed matrix and quantized and on which vector centralization has been performed in accordance with a central point vector in the category before the rotation;

wherein before the rotation, the computer instruction is configured to be executed by a computer to:

acquire a feature value and a feature vector by performing feature value decomposition on a covariance matrix before the rotation, wherein the covariance is expressed as $cov=(c+c^T)/(2\times(n-1))-v^Tv$, wherein cov represents the covariance matrix, c represents a sum of inner products of all vectors in each category of the search library, n represents a quantity of vectors in each category of the search library, and v represents the central point vector in each category of the search library;

create the transposed matrix according to the feature value and the feature vector.

10. The non-transitory computer-readable storage medium according to claim 9, wherein the computer instruction is further configured to be executed by the computer to:
calculate a residual error between the central point vector of each category in the search library and the query vector, and determine the first category in accordance with the residual error.

11. The non-transitory computer-readable storage medium according to claim 10, wherein a central point vector of a target category in the search library is determined in accordance with a sum of all vectors included in the target category and/or the quantity of the vectors included in the target category, and the target category is any category in the search library.

12. The non-transitory computer-readable storage medium according to claim 9, wherein the computer instruction is further configured to be executed by the computer to:
calculate a residual error between the query vector and each of a plurality of central sub-vectors in the first category, take N central sub-vectors in the plurality of central sub-vectors as the target vector matching the query vector in accordance with the residual errors, and acquire the multimedia content corresponding to the target vector, where N is an integer greater than or equal to 1.

* * * * *